US010589688B2

(12) United States Patent
Diaz Paredes et al.

(10) Patent No.: US 10,589,688 B2
(45) Date of Patent: Mar. 17, 2020

(54) STORAGE FOR SEATING ASSEMBLY (71) Applicant: Ford Global Technologies, LLC, Dearborn, MI (US)

(72) Inventors: Gerardo Diaz Paredes, Mexico City (MX); John Carl Faust, Farmington Hills, MI (US); João Marcos de Oliveira Ramos, Ann Arbor, MI (US); Nicole Rush, Dearborn, MI (US); Keith Rogman, Fenton, MI (US); Patrick Vanderpool, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/992,631

(22) Filed: May 30, 2018

(65) Prior Publication Data
US 2019/0366932 A1 Dec. 5, 2019

(51) Int. Cl.
*B60R 7/00* (2006.01)
*B60R 7/04* (2006.01)
*B60N 3/00* (2006.01)
*B60R 7/08* (2006.01)

(52) U.S. Cl.
CPC .............. *B60R 7/005* (2013.01); *B60N 3/00* (2013.01); *B60R 7/043* (2013.01); *B60R 7/08* (2013.01)

(58) Field of Classification Search
CPC ........... B60R 7/005; B60R 7/08; B60R 7/043; B60N 3/00

USPC ........... 297/188.07, 188.06, 188.04, 188.05, 297/188.2; 224/275
See application file for complete search history.

(56) References Cited

U.S. PATENT DOCUMENTS

| 1,616,591 | A | * | 2/1927 | McGee | B60R 7/005 224/563 |
| 2,853,219 | A | * | 9/1958 | Schwartz | B60R 7/12 224/275 |
| 5,004,295 | A | | 4/1991 | Inoue | |
| 5,314,232 | A | * | 5/1994 | Hopkins | A47D 15/00 206/553 |
| 5,415,457 | A | | 5/1995 | Kifer | |
| 5,724,707 | A | | 3/1998 | Kirk et al. | |
| 7,523,991 | B2 | * | 4/2009 | Thompson | B60N 2/58 297/452.38 |
| 7,891,733 | B1 | * | 2/2011 | Clarke | A47C 7/62 211/118 |
| 7,954,654 | B1 | * | 6/2011 | Hoyt | F41B 5/14 211/60.1 |
| 8,627,514 | B1 | | 1/2014 | Scoggins et al. | |
| 10,308,301 | B2 | * | 6/2019 | Walk | B62J 1/18 |
| 2010/0107861 | A1 | | 5/2010 | Carter | |
| 2013/0193179 | A1 | | 8/2013 | Davidson | |

* cited by examiner

*Primary Examiner* — Milton Nelson, Jr.
(74) *Attorney, Agent, or Firm* — David Coppiellie; Price Heneveld LLP (57) ABSTRACT

A vehicle seating assembly includes a seatback having a frame. A storage member is disposed on an outer surface of the seatback. A retainer is attached to the frame and the storage member. The retainer transfers a load exerted on the storage member to the frame.

20 Claims, 9 Drawing Sheets

STORAGE FOR SEATING ASSEMBLY

FIELD OF THE DISCLOSURE

The present disclosure generally relates to vehicle seating assemblies, and more particularly to storage areas for vehicle seating assemblies.

BACKGROUND OF THE DISCLOSURE

Seating assemblies typically include a seatback to support a back of an occupant in an upright sitting position and various reclined positions. Similar to other areas of a vehicle interior, such as consoles and door trim panels, seatbacks commonly include storage areas for passenger items. However, improved seatback storage areas for passenger items are always desired.

SUMMARY OF THE DISCLOSURE

According to one aspect of the present disclosure, a vehicle seating assembly includes a seatback having a frame. A storage member is disposed on an outer surface of the seatback. A retainer is attached to the frame and the storage member. The retainer transfers a load exerted on the storage member to the frame.

Embodiments of the first aspect of the disclosure can include any one or a combination of the following features:
- the storage member comprises a pocket assembly;
- the pocket assembly comprises an outward facing portion and a seatback facing portion, and wherein the outward facing portion includes a stiffener;
- the outward facing portion includes a strap with loops disposed along a length of the strap, wherein the loops retain passenger items disposed on the outward facing portion, wherein the stiffener is disposed within the outward facing portion, and wherein the strap is fastened to the stiffener at one or more locations between the loops;
- the stiffener is directly attached to the retainer;
- at least a portion of the load from a passenger item fastened to the strap with loops is transferred to the stiffener, the retainer, and the frame;
- the retainer comprises a first end and a second end and wherein the first end of the retainer is fastened to a first frame member and the second end of the retainer is fastened to a second frame member;
- a fastener releasably fastens an outer periphery of the outward facing portion to an outer periphery of the seatback facing portion to form an enclosed receptacle partially defined by the outward facing portion and the seatback facing portion;
- the fastener comprises a zipper; and
- the strap with loops is in a substantially horizontal position.

According to another aspect of the present disclosure, a seating assembly includes a seatback. An external storage area is disposed on an outer surface of the seatback and includes an elongated member with a plurality of hangers. An internal storage area is disposed between the external storage area and the seatback. The internal storage area includes a selectively closable receptacle.

Embodiments of the second aspect of the disclosure can include any one or a combination of the following features:
- the internal storage area comprises an outward facing portion and a seatback facing portion and wherein the outward facing portion and the seatback facing portion define the selectively closable receptacle;
- a first support member is disposed within the outward facing portion;
- a second support member is disposed within the seatback facing portion; and
- the first support member and the elongated member with a plurality of hangers are a single component.

According to yet another aspect of the present disclosure, a storage pouch is disposed on a vehicle seatback. A first support member for supporting passenger items is disposed outside of the storage pouch. A second support member for supporting passenger items is disposed in the storage pouch and passenger items disposed outside of the storage pouch. The second support member is coupled to a seatback frame and the first support member is coupled to the second support member.

Embodiments of the third aspect of the disclosure can include any one or a combination of the following features:
- the storage pouch includes a selectively operable fastener for opening and closing the pouch;
- the fastener is a zipper and wherein the storage pouch comprises a vehicle facing panel and a seatback facing panel and wherein the zipper includes a first set of teeth located on the seatback facing panel and a second set of teeth on the vehicle facing panel;
- the storage pouch includes a strap with a first end, a second end, and one or more intermediate attachment areas, wherein the one or more intermediate attachment areas are between the first end and the second end and wherein the first end, the second end, and the one or more intermediate attachment areas are attached to the first support member; and
- the strap with loops, the first support member, and the second support member are a unitary part.

These and other aspects, objects, and features of the present disclosure will be understood and appreciated by those skilled in the art upon studying the following specification, claims, and appended drawings.

DETAILED DESCRIPTION

Figure 1:
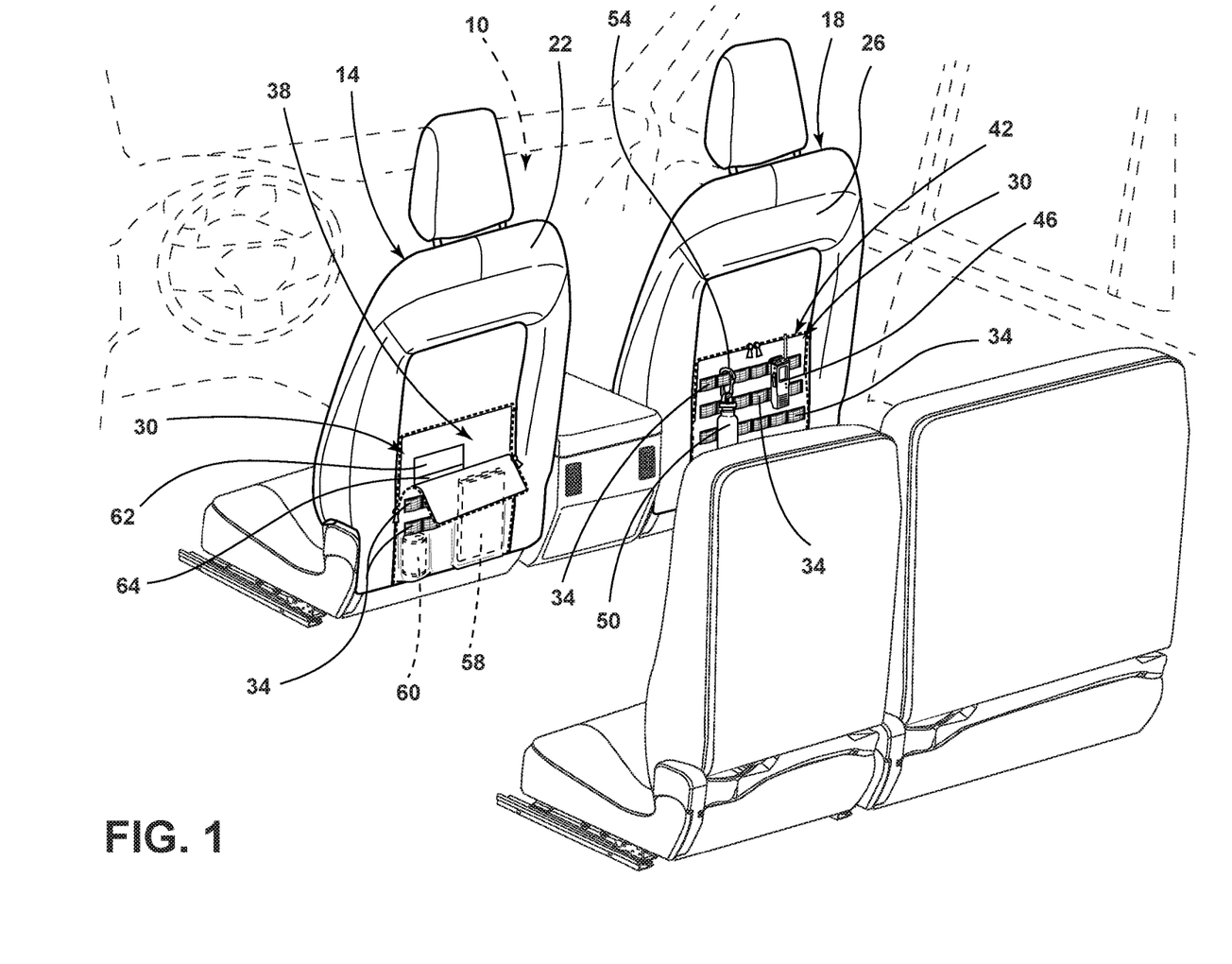
FIG. 1 is a back perspective view of seatbacks with a pocket assembly and straps with loops for retaining passenger items according to an aspect of the disclosure.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a vehicle interior 10 is illustrated with a driver side seating assembly 14 and a passenger side seating assembly 18. The driver side seatback 22 and the passenger side seatback 26 are equipped with a pocket assembly 30 for containing passenger items and straps 34 for supporting passenger items. It is desirable to have a variety of easily accessible, visible storage areas on a driver side seatback 22 and a passenger side seatback 26. Passengers seated in the driver side seating assembly 14 are able to see items stored on the passenger side seatback 26. Passengers seated in the passenger side seating assembly 18 are able to see items stored on the driver side seatback 22. Pocket assemblies 30 on the driver side seatback 22 and passenger side seatback 26 provide additional space for passenger items. The pocket assembly 30 on the driver side seatback 22 is shown in an open state 38. The pocket assembly 30 on the passenger side seatback 26 is shown in a closed state 42. Passenger items, including, but not limited to, a cell phone 46 and a water bottle 50 suspended from a carabiner 54 are shown disposed on the straps 34 of the passenger side seatback 26. In addition to the cell phone 46 and the water bottle 50, a variety of additional passenger items, such as snacks, dog leashes, ice scrapers, and other items typically transported in vehicles, may be stored on the straps 34. Passenger items may be hung within a strap 34 (e.g., cell phone 46) or suspended from a strap 34 (e.g., carabiner 54 with water bottle 50). For exemplary purposes, the pocket assembly 30 on the driver side seatback 22 is shown holding a book 58 and a beverage can 60. First and second compartments are disposed in the pocket assembly 30. In the depicted aspect, the first compartment is the upper compartment 62, and the second compartment is the lower compartment 64.

Figure 2:
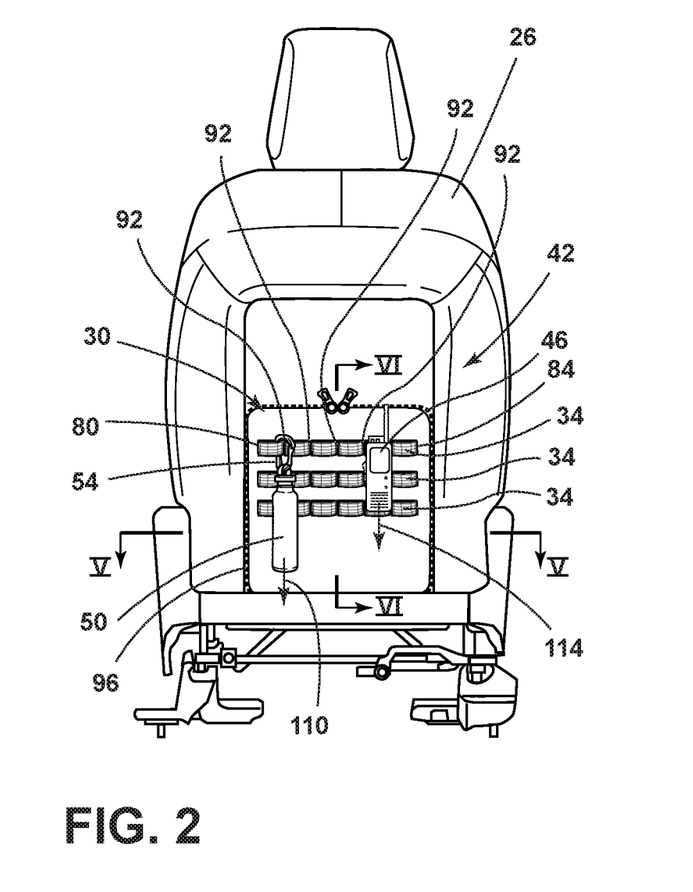
FIG. 2 is a back elevational view of a passenger side seatback with a pocket assembly and straps for retaining passenger items of FIG. 1.

Referring to FIG. 2, three substantially horizontal straps 34 are disposed on an outward facing portion 70 of the pocket assembly 30. Each substantially horizontal strap 34 includes a first end 80 and a second end 84. Intermediate attachment areas 92 are between the first and second ends 80, 84 of the straps 34. In various aspects, the straps 34 are sewn, heat staked, or otherwise attached to the stiffener 88 at the intermediate attachment areas 92 and the first and second ends 80, 84 of the straps 34. Passenger items disposed on the straps 34 can include, for example, the water bottle 50 suspended from the carabiner 54 and the cell phone 46.

Figure 3:
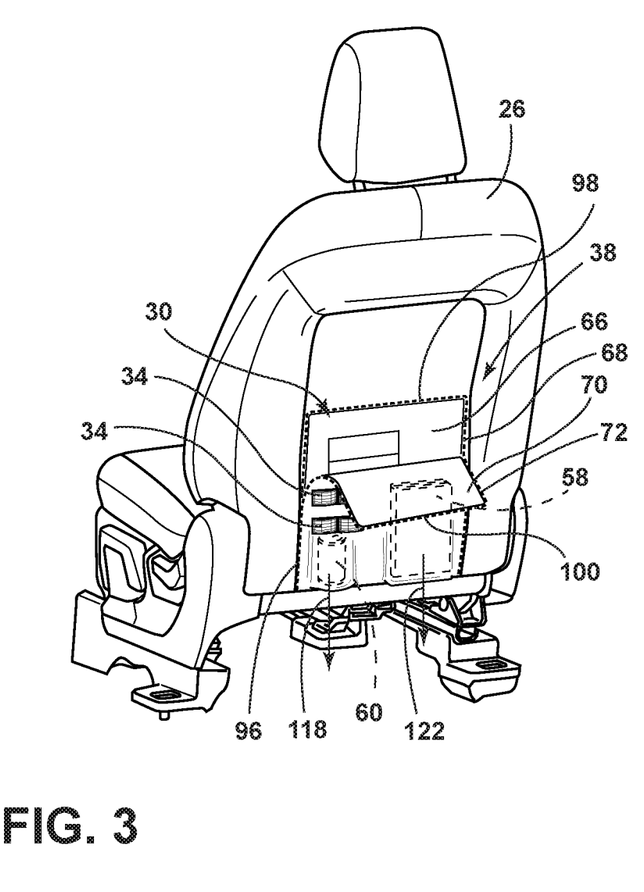
FIG. 3 is a back perspective view of the passenger side seatback with the pocket assembly and straps for retaining passenger items of FIG. 1 with the pocket assembly in an open state.

Referring to FIGS. 2-3, the pocket assembly 30 includes a seatback facing portion 66 and an outward facing portion 70. The passenger side seatback 26 pocket assembly 30 is shown in a closed state 42 (FIG. 2) and an open state 38 (FIG. 3). The pocket assembly 30 may include a selectively operable fastener that connects the outward facing portion 70 to the seatback facing portion 66. In the depicted aspect, the fastener is a zipper 96. The zipper 96 includes a first set of teeth 98 disposed on the seatback facing portion 66 and a second set of teeth 100 disposed on the outward facing portion 70

Referring to FIGS. 2 and 3, the items disposed in the pocket assemblies 30 and on the straps 34 exert loads on the pocket assemblies 30 and the straps 34. Specifically, these items can exert a force depicted by arrows 110, 114, 118, and 122 How these forces 110, 114, 118, and 122 are received by the pocket assembly 30 will be described more fully below.

Figure 4:
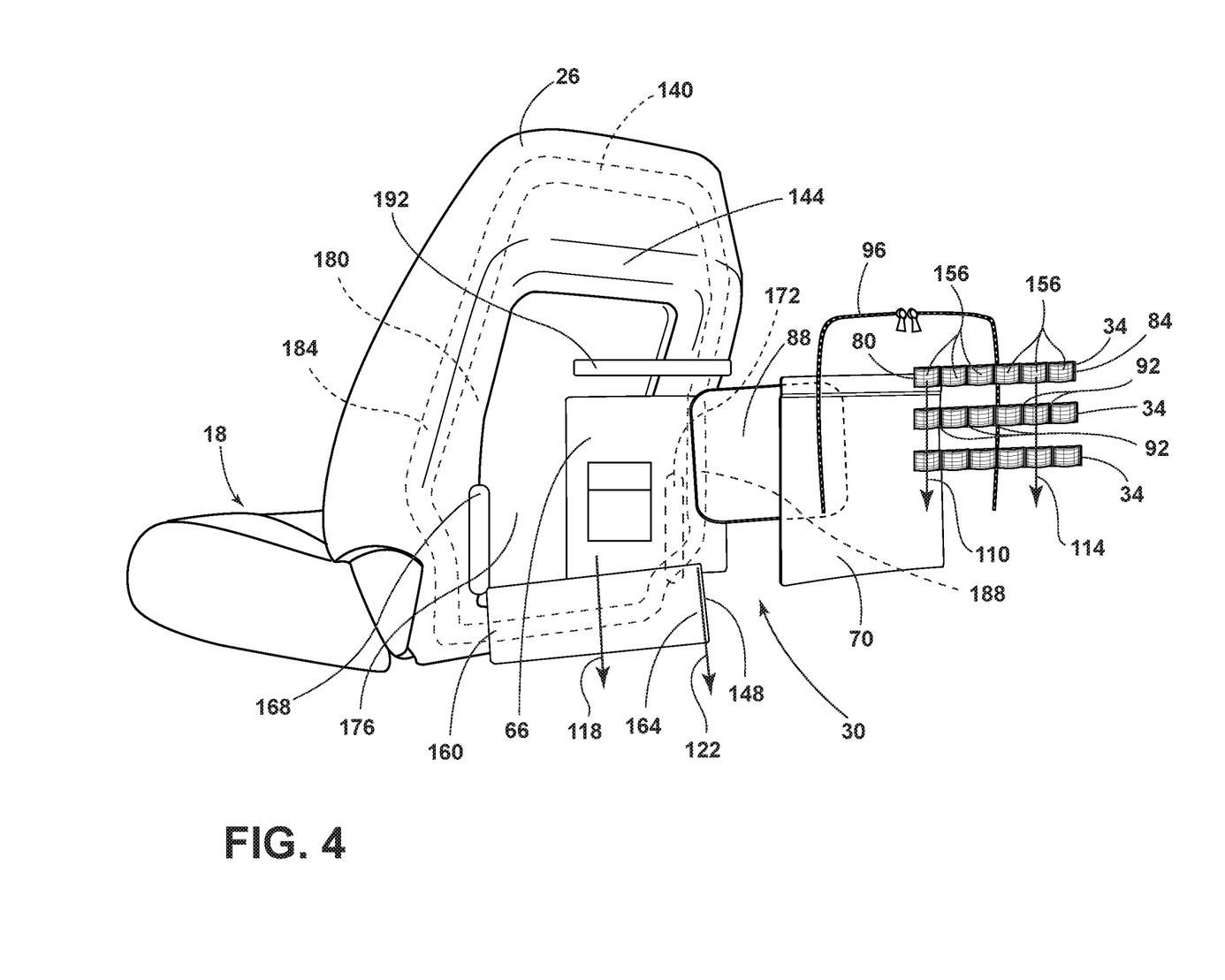
FIG. 4 is an exploded view of the passenger side seatback with the pocket assembly and straps for retaining passenger items of FIG. 1.

Referring to FIG. 4, an exploded view of the seatback 26 of the passenger side seating assembly 18 is shown. The seatback 26 includes a frame 140, a storage member disposed on an outer surface 144 of the seatback 26, and a retainer 148 attached to the frame 140 and the storage member. In the depicted aspect, the storage member is a pocket assembly 30. The pocket assembly 30 includes an outward facing portion 70 and a seatback facing portion 66. In the depicted aspect, the outward facing portion 70 of the pocket assembly 30 includes three straps 34 with loops 156 disposed along the lengths of straps 34. The loops 156 retain passenger items disposed on the outward facing portion 70. The stiffener 88 is disposed within the outward facing portion 70. The strap 34 is fastened to the stiffener 88 at the first end 80, intermediate attachment areas 92 between the loops 156, and the second end 84. In various aspects, the stiffener 88 may be directly attached to the retainer 148. Also, in various aspects, at least a portion of a load from a passenger item fastened to the strap 34 with loops 156 (FIG. 3) is transferred to the stiffener 88, the retainer 148, and the frame 140. The retainer 148 includes a first end 160 and a second end 164. The respective first and second ends 160, 164 of the retainer 148 may be inserted into first and second slots 168, 172 in the seatback cover 176 so that the respective first and second ends 160, 164 extend into the seatback interior 180 and attach to the first frame member 184 and the second frame member 188. The pocket assembly 30 may also include a supplemental retainer 192 that is located at the top of the seatback facing portion 66 of the pocket assembly 30. The stiffener 88 is typically disposed behind the outward facing portion 70 of the pocket assembly 30. The retainer 148 is typically disposed beneath the seatback cover 176. In various aspects, the intermediate attachment areas 92 and the first and second ends 80, 84 of the straps 34 may be sewn, heatstaked, or otherwise attached to the stiffener 88. In various aspects, the straps 34 may be canvas, nylon, plastic, or another material. The retainer 148 is shown attached to the first and second frame members 184, 188. In various aspects, the retainer may be a flexible nylon, another stretch-and-fit material or a similar flexible and/or elastic material.

Figure 4A:
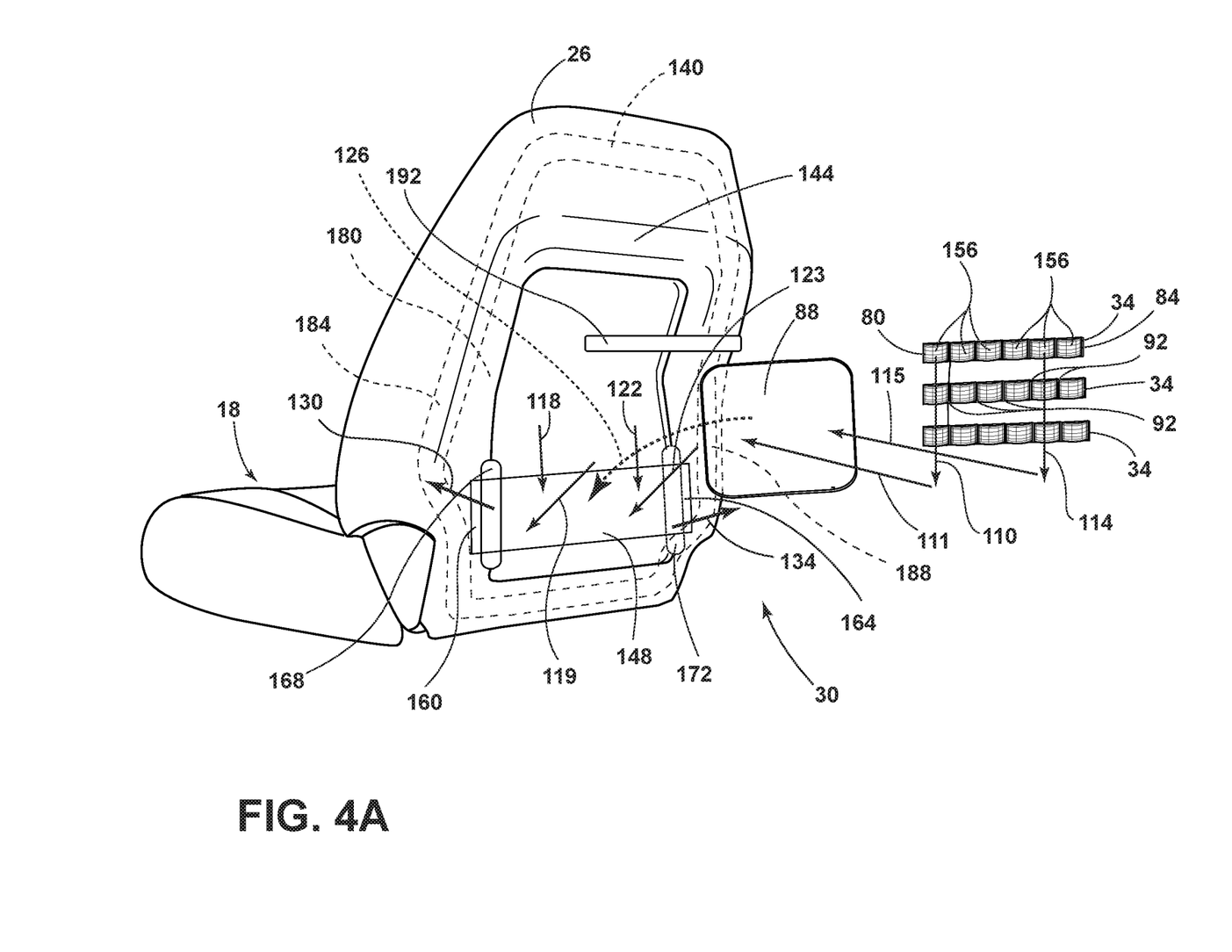
FIG. 4A is a schematic version of FIG. 4 showing forces acting on the stiffener, the retainer, and the frame.

FIG. 4A is a schematic view of FIG. 4. FIG. 4A shows forces acting on the stiffener 88, the retainer 148, and the frame 140. In the depicted aspect, the retainer 148 transfers the forces 110, 114, 118, 122 exerted on the storage member to the frame 140. Force 110 on the strap 34 is transferred to stiffener 88 as the force depicted by arrow 111. Force 114 on the strap 34 is transferred to stiffener 88 as the force depicted by arrow 115. The loads on the stiffener 88 (including at least force 111 and force 115) are transferred to the retainer 148 by the force depicted by arrow 126. The retainer 148 can also receive additional loads, such as those depicted by force arrows 118, 122 from items disposed in the pocket assembly 30. The loads on the retainer 148 include at least (1) the force depicted by arrow 126 transferring a load from the stiffener 88 to the retainer 148 and (2) the forces depicted by arrows 118, 122 from items in the pocket assembly 30. The retainer 148 transfers at least a portion of the loads depicted by arrows 126, 118, 122 to the first frame member 184 with the force depicted by arrow 130.

Referring to FIGS. 4-4A, the combination of a rigid reinforcement (stiffener 88) and a movable member (retainer 148) attached to frame 140 transfers the forces 110, 114, 118, 122 to the frame 140. The load on the stiffener 88 is transferred to the frame 140 by retainer 148. Typically, the retainer 148 is flexible and moves with the stiffener 88, yet the retainer 148 is strong enough to transfer forces 110, 114, 118, 122 to the frame 140. Thus, the forces 110, 114, 118, 122 are directed into the fabric (e.g., outward facing portion 70, seatback facing portion 66, seatback cover 176) of the seatback 26 and avoid deformation of the fabric (e.g., outward facing portion 70, seatback facing portion 66, seatback cover 176) of the seatback 26.

Figure 5:
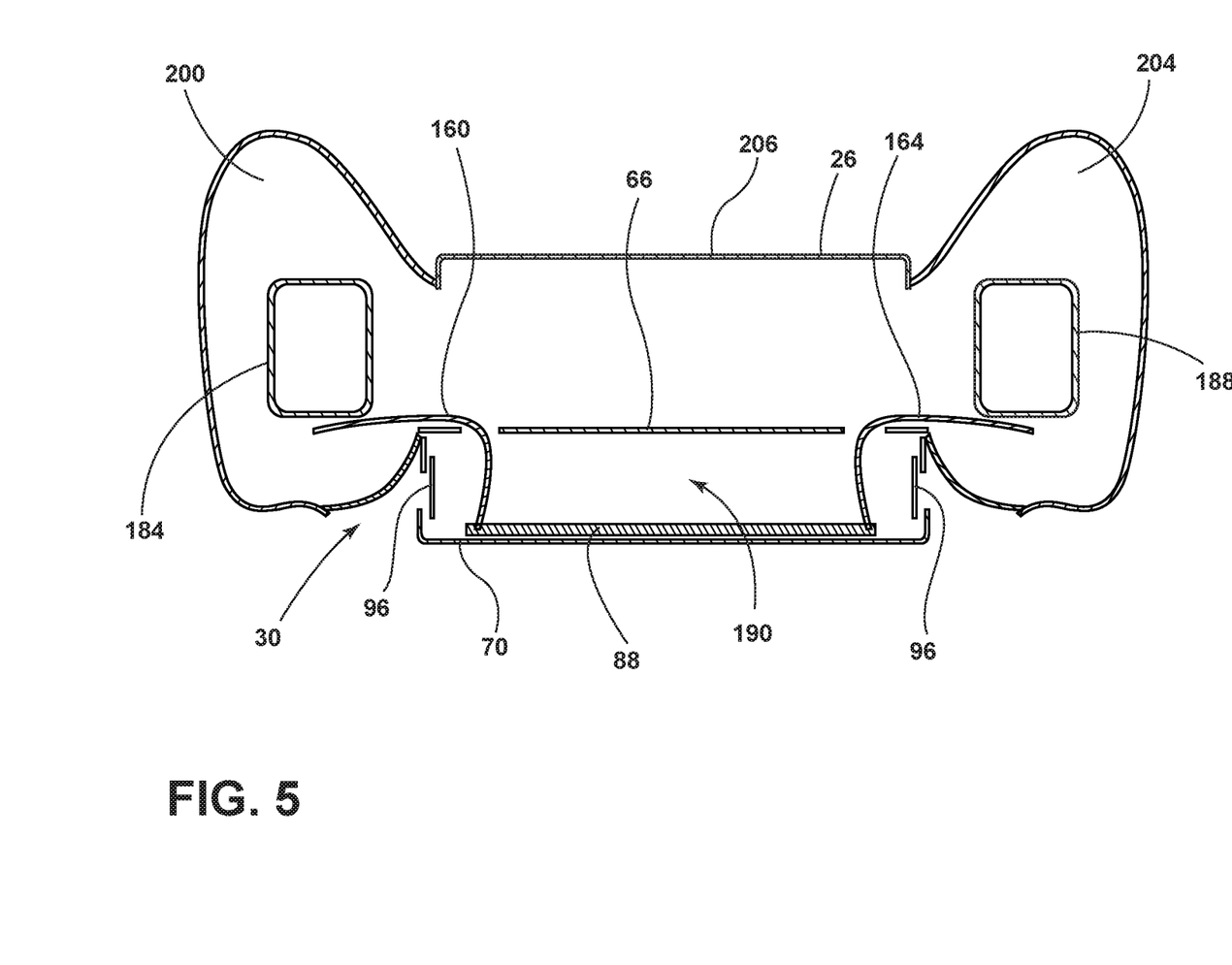
FIG. 5 is a cross-sectional view of the passenger side seatback taken along line V-V of FIG. 2.

Referring to FIG. 5, a cross-sectional view of the seatback 26 taken along V-V of FIG. 2 shows a pocket assembly 30 including a seatback facing portion 66 and an outward facing portion 70. A selectively operable zipper 96 is disposed between the seatback facing portion 66 and the outward facing portion 70. The retainer first end 160 and the retainer second end 164 attach to the first frame member 184 and the second frame member 188. The first frame member 184 is disposed in or near the first side bolster 200, and the second frame member 188 is disposed in or near the second side bolster 204. The seatback 26 includes passenger facing surface 206. The seatback facing portion 66 and the outward facing portion 70 may be joined by zipper 96 to form a receptacle 190.

Figure 6:
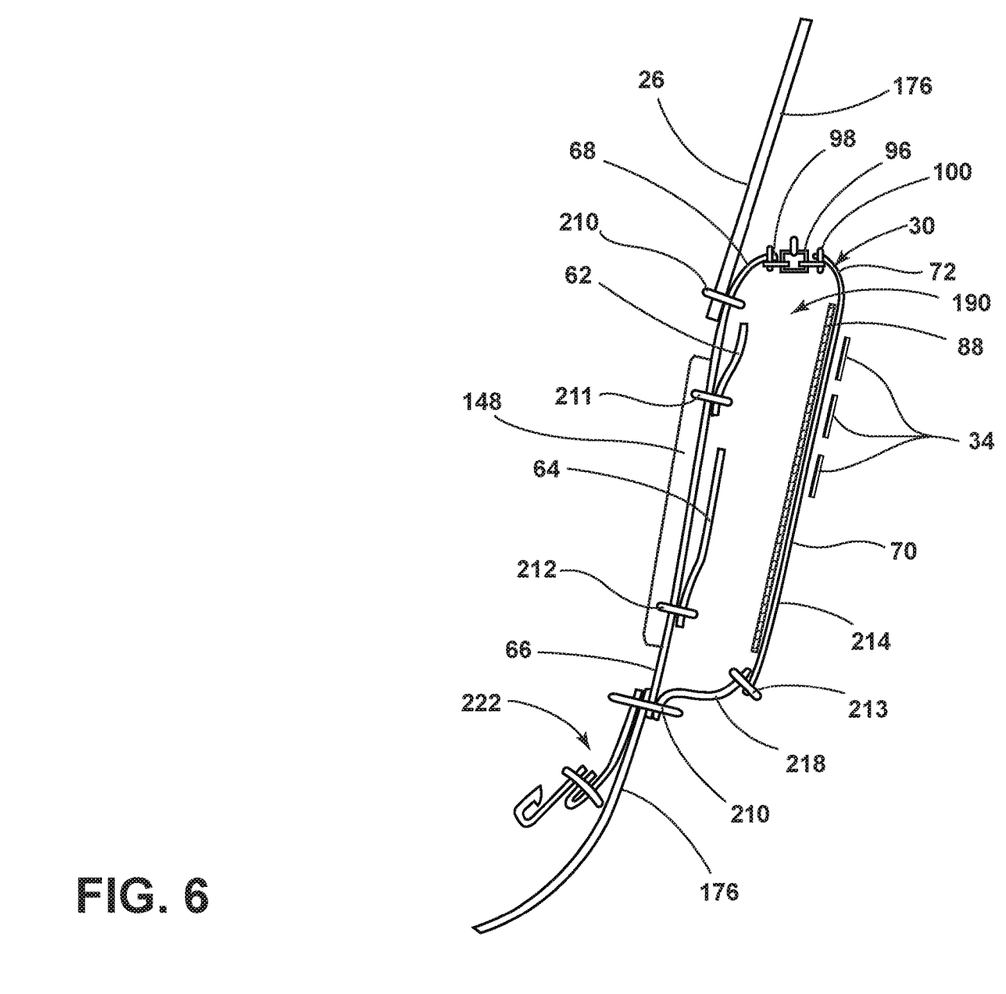
FIG. 6 is a cross-sectional view of the pocket taken along line VI-VI of FIG. 2 according to an aspect of the disclosure.

Referring now to FIG. 6, a cross-sectional view of the seatback 26 of FIG. 2 is shown taken along line VI-VI. A seatback facing portion 66 and an outward facing portion 70 define the pocket assembly 30. A fastener releasably fastens an outer periphery 72 of the outward facing portion 70 of the pocket assembly 30 to an outer periphery 68 of the seatback facing portion 66 of the pocket assembly 30 to form an enclosed receptacle 190 partially defined by the outward facing portion 70 and the seatback facing portion 66. In various aspects, the fastener may be a zipper 96, a hook-and-loop fastener, or other similar elongated fastening mechanism. Where a zipper 96 is used, the zipper 96 includes a first set of teeth 98 disposed at the outer periphery 68 of the seatback facing portion 66. The zipper 96 includes a second set of teeth 100 disposed at the outer periphery 72 of the outward facing portion 70. The seatback facing portion 66 is joined to the seatback cover 176 with fasteners 210. The outward facing portion 70 includes a first part 214 and a second part 218. Fastener 213 joins the first part 214 to the second part 218. Three straps 34 are disposed on the first part 214 of the outward facing portion 70. A fastener 211 attaches an upper compartment 62 to the seatback facing portion 66, and a fastener 212 attaches a lower compartment 64 to the seatback facing portion 66. Straps 34 are disposed on the first part 214 of the outward facing portion 70. Stiffener 88 is disposed adjacent the first part 214 of the outward facing portion 70. A hook assembly 222 typically anchors the pocket assembly 30 to the seatback frame 140 or other seatback area.

Figure 7:
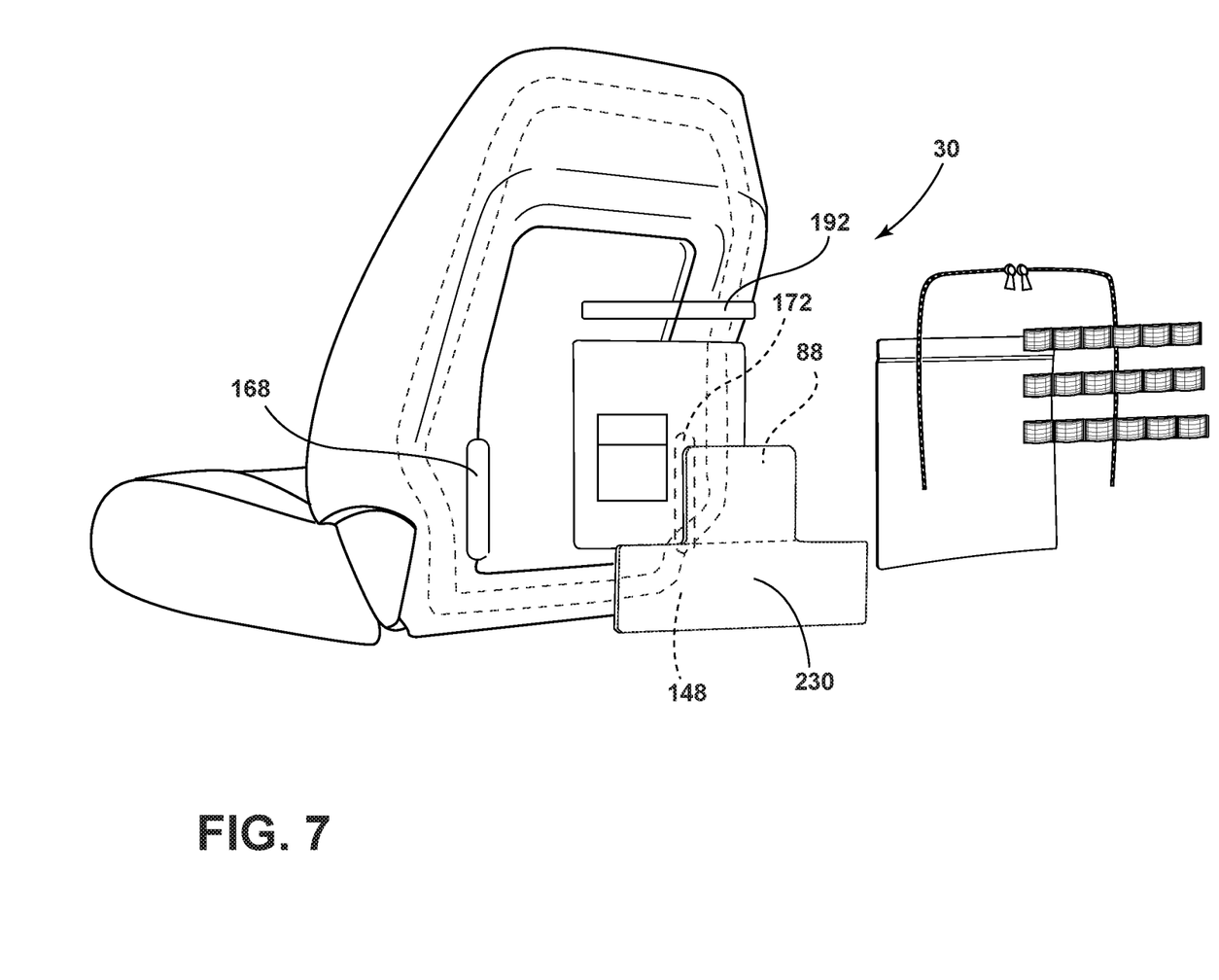
FIG. 7 is an exploded view of the passenger side seatback according to another aspect of the disclosure.

Referring now to FIG. 7, an alternative aspect of FIG. 4 is shown. The retainer 148 and the stiffener 88 are a unitary part 230 in the alternative aspect of FIG. 7.

Figure 8:
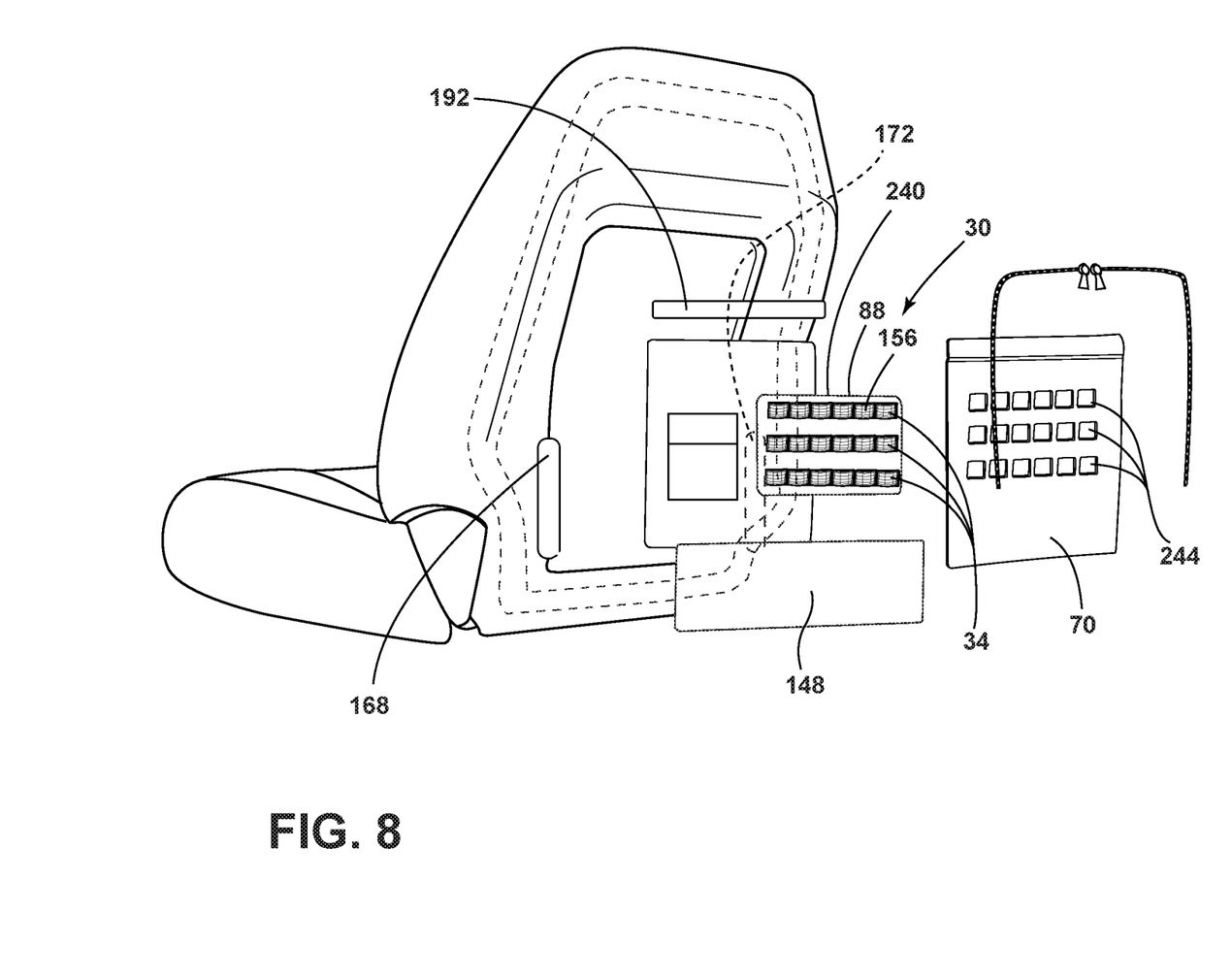
FIG. 8 is an exploded view of the passenger side seatback according to yet another aspect of the disclosure.

Referring to FIG. 8, another alternative aspect of the seating assembly of FIG. 4 is shown. In the alternative aspect of FIG. 8, the stiffener 88 and the straps 34 with loops 156 are a single unitary part 240. The outward facing portion 70 of the pocket assembly 30 includes recesses 244 that correspond to the loops 156 disposed on the stiffener 88 so that the loops 156 protrude through the recesses 244 in the outward facing portion 70 of the pocket assembly 30.

Figure 9:
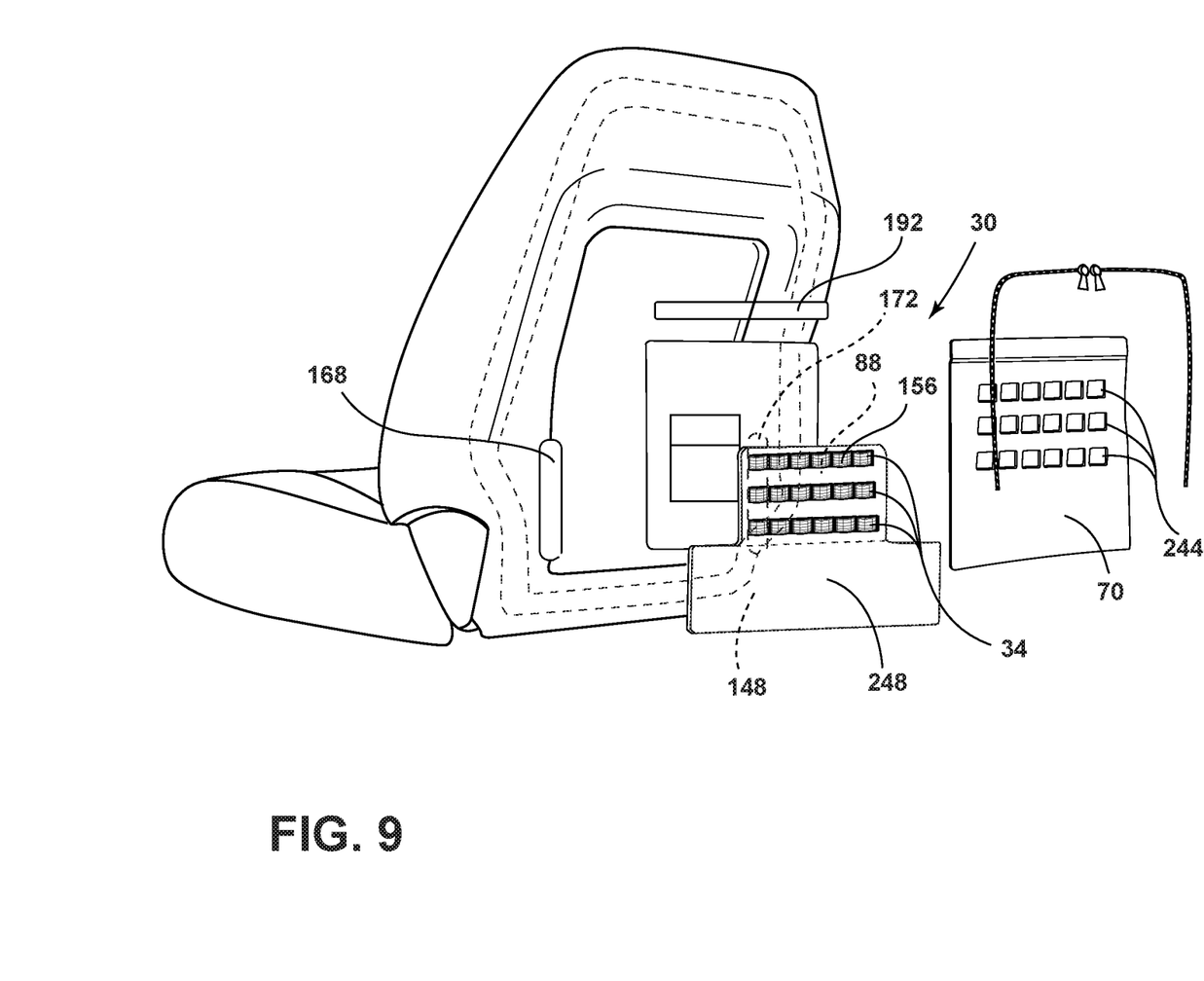
FIG. 9 is an exploded view of the passenger side seatback according to an additional aspect of the disclosure.

As shown in FIG. 9, in various aspects, the retainer 148, the stiffener 88, and the straps 34 with loops 156 may be a unitary part 248. Referring to FIGS. 7-9, in various aspects, the supplemental retainer 192 may be attached to unitary parts 230, 240, and 248.

Referring to FIGS. 1-9, a seating assembly 18 may include a seatback 26 with an external storage area (e.g., straps 34 disposed on outward facing portion 70) disposed on an outer surface 144 of the seatback 26. The external storage area may include an elongated member (e.g., strap 34) with a plurality of hangers (e.g., loops 156). The seatback 26 may also include an internal storage area (e.g., receptacle 190) disposed between the external storage area and the seatback 26. An outward facing portion 70 and a seatback facing portion 66 define the internal storage area. A first support member (e.g., stiffener 88) may be disposed within the outward facing portion 70. A second support member (e.g., retainer 148) may be disposed within the seatback facing portion 66. In various aspects, the first support member and the elongated member with a plurality of hangers may be a single component (e.g., unitary part 240). Typically, the hangers are anchored to the first support member so that loads disposed on the hangers are transferred to the first support member. Typically, the first support member is positioned relative to the second support member so that the second support member carries at least some of the load of the first support member. Typically, the load disposed on the second support member is at least partially supported by the frame 140.

Referring again to FIGS. 1-9, a storage pouch (e.g., pocket assembly 30) may be disposed on a vehicle seatback 26. The storage pouch may include a first support member (e.g., stiffener 88) for supporting passenger items disposed on the outside of the storage pouch (e.g., on straps 34). The storage pouch may also include a second support member (e.g., retainer 148) for supporting passenger items disposed in the storage pouch and passenger items disposed outside the storage pouch. The second support member may be coupled to a seatback frame 140, and the first support member may be coupled to the second support member. Typically, the seatback frame 140, the second support member, and the first support member bear the load disposed within the storage pouch and outside of the storage pouch. The storage pouch includes a selectively operable fastener for opening and closing the storage pouch. The fastener may be a zipper 96, and the storage pouch includes a vehicle facing panel (e.g., outward facing portion 70) and a seatback facing panel (e.g., seatback facing portion 66). The zipper 96 includes a first set of teeth 98 located on the seatback facing panel and a second set of teeth 100 located on the vehicle facing panel. A storage compartment (receptacle 190) may be disposed within the storage pouch. The storage compartment may include a zipper 96.

A variety of advantages may be derived from the use of the present disclosure. A passenger is able to store passenger items in visible, accessible areas on the straps 34 of the vehicle seatbacks 22, 26. The pocket assemblies 30 disposed on the seatbacks 22, 26 allow for hidden, secure storage of passenger items. The seatback storage areas (pocket assemblies 30 and straps 34) accommodate various types and sizes of passenger items. Passenger items stored on the seatbacks 22, 26 remain clean because they are not placed on the floor, where the passenger items might be stored if seatback storage were not available. Also, children sitting in the rear seats of a vehicle are able to store and access a wide variety of books, toys, and snacks that may be stored in the seatback storage areas. The seatback storage areas provide efficient use of space within the vehicle interior 10.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly comprising:
   a seatback having a frame;
   a storage member disposed on an outer surface of the seatback; and
   a retainer attached to the frame and the storage member, wherein the retainer transfers a load exerted on the storage member to the frame, wherein the storage member comprises a pocket assembly, wherein the pocket assembly comprises an outward facing portion and a seatback facing portion, wherein the outward facing portion includes a stiffener, wherein the outward facing portion includes a strap with loops disposed along a length of the strap, wherein the strap with loops disposed along the length of the strap retains passenger items disposed on the outward facing portion of the pocket assembly, wherein the stiffener is disposed within the outward facing portion of the pocket assembly, wherein the strap with loops disposed along the length of the strap is fastened to the stiffener at one or more locations between the loops, and wherein the stiffener is directly attached to the retainer.

2. The vehicle seating assembly of claim 1, wherein at least a portion of the load from a passenger item fastened to the strap with loops disposed along the length of the strap is transferred to the stiffener, the retainer, and the frame.

3. The vehicle seating assembly of claim 2, wherein the retainer comprises a first end and a second end and wherein the first end of the retainer is fastened to a first frame member and the second end of the retainer is fastened to a second frame member.

4. The vehicle seating assembly of claim 3, wherein a fastener releasably fastens an outer periphery of the outward facing portion to an outer periphery of the seatback facing portion to form an enclosed receptacle partially defined by the outward facing portion and the seatback facing portion.

5. The vehicle seating assembly of claim 4, wherein the fastener comprises a zipper.

6. The vehicle seating assembly of claim 5, wherein the strap with loops disposed along the length of the strap is in a substantially horizontal position.

7. A seating assembly comprising:
   a seatback comprising:
      an external storage area disposed on an outer surface of the seatback and comprising an elongated member with a plurality of loops;
      an internal storage area disposed between the external storage area and the seatback, wherein the internal storage area includes a selectively closable receptacle;
      a frame disposed within the seatback and including opposing first and second longitudinal frame members disposed on opposing sides of the seatback; and
      a retainer for supporting the external and internal storage areas and including a first end directly engaged with the first longitudinal frame member and a second end directly engaged with the second longitudinal frame member.

8. The seating assembly of claim 7, wherein the internal storage area comprises an outward facing portion and a seatback facing portion and wherein the outward facing portion and the seatback facing portion define the selectively closable receptacle.

9. The seating assembly of claim 8, wherein the retainer is disposed within the seatback facing portion.

10. The seating assembly of claim 8, further comprising:
    a stiffener, wherein the stiffener is disposed within the outward facing portion.

11. The seating assembly of claim 9, wherein the stiffener and the elongated member with a plurality of loops are a single component.

12. The vehicle seating assembly of claim 9, wherein the elongated member includes a strap.

13. The vehicle seating assembly of claim 12, wherein one or more intermediate attachment areas disposed between any two adjacent loops of the plurality of loops are attached to the stiffener.

14. The vehicle seating assembly of claim 13, wherein the one or more intermediate attachment areas are sewn or heat staked to the stiffener.

15. A vehicle seating assembly comprising:
    a support member for supporting passenger items disposed on a seatback;
    a seatback frame including:
       a first longitudinal member; and
       a second longitudinal member; and
    an elongated member including:
       a plurality of loops disposed along a length of the elongated member;
       a first end engaged with the first longitudinal member; and
       a second end engaged with the second longitudinal member, wherein the elongated member is fastened to the support member at one or more locations between a first loop of the plurality of loops and a second loop of the plurality of loops.

16. The vehicle seating assembly of claim 15, wherein the elongated member includes a strap.

17. The vehicle seating assembly of claim 15, wherein the support member includes a retainer.

18. The vehicle seating assembly of claim 17, wherein the support member includes a stiffener.

19. The vehicle seating assembly of claim 17, further comprising:
    a storage pouch disposed on the seatback and above the retainer.

20. The vehicle seating assembly of claim 17, wherein the retainer is flexible.

* * * * *

UNITED STATES PATENT AND TRADEMARK OFFICE
CERTIFICATE OF CORRECTION

PATENT NO. : 10,589,688 B2
APPLICATION NO. : 15/992631
DATED : March 17, 2020
INVENTOR(S) : Diaz Paredes et al.

Page 1 of 1

It is certified that error appears in the above-identified patent and that said Letters Patent is hereby corrected as shown below:

In the Claims

Column 8;
Claim 11, Line 19; "9" should be --10--.
Claim 12, Line 22; "9" should be --10--.

Signed and Sealed this
First Day of September, 2020

Andrei Iancu
*Director of the United States Patent and Trademark Office*